United States Patent Office 3,715,926
Patented Feb. 13, 1973

3,715,926
DUAL MODE ALTIMETER
Geoffrey S. Hedrick, Malvern, Pa., assignor to Lear Siegler, Inc., Grand Rapids, Mich.
Filed June 28, 1971, Ser. No. 157,582
Int. Cl. G01l 7/14
U.S. Cl. 73—387
20 Claims

ABSTRACT OF THE DISCLOSURE

In a dual mode altimeter having an altitude display means, pressure responsive drive means, including diaphragm capsules adapted to expand and contract in response to changes in altitude, mechanical means connecting the pressure responsive drive means to the display means for driving the display means in response to expansion and contraction of the capsules, a remote altitude signal source and a servo means including a follow-up synchro connected in driving relationship to the altitude display, the servo being responsive to a signal received from the remote source for effecting overriding of the pressure responsive drive means for driving the mechanical means and, thus, the display means in response to the received signal, the improvement comprises a brushless D.C. motor operatively connected to the synchro in a closed servo loop and to the mechanical means. The motor is directly connected to a central pinion which is in meshing relationship with a gear sector operatively connected through a rocking shaft to the diaphragm capsules. In the servoed mode of the altimeter, the brushless D.C. motor drives the altitude display. In the pneumatic mode, the servo loop is electrically opened and the excitation windings of the motor are grounded, the motor providing magnetic damping in the pneumatic mode. Zero correction of the servo loop is provided by scaling and summing one of the pair of sinusoidal outputs of the synchro with the other sinusoidal output, the output providing an error correction signal for the servo loop. The brushless D.C. motor includes an independent feedback path including a second stator winding for providing direct rate feedback control.

BACKGROUND OF THE INVENTION

Field of the invention

The present invention relates to altimeters which are rendered directly responsive to pressure activation due to changes in altitude, or alternately, responsive to an altitude signal received from a remote signal source.

DESCRIPTION OF THE PRIOR ART

Dual mode altimeters, that is altimeters in which the altitude display is driven in response to pressure activation due to changes in altitude sensed by a set of altitude diaphragms in a pneumatic mode, or alternately, driven in response to an altitude signal received from a remote signal source by a servo motor contained in a servo control loop in a servoed mode, are well known, such as the altimeters disclosed in U.S. Pat. Nos. 3,230,775 and 3,495,462. However, some prior art altimeters require mechanical engagement and disengagement of the servo motor drive mechanism from the display means drive shaft which is common for both the servoed mode and the pneumatic mode, in order to accomplish mode switching. In addition, conventional A.C. servo motors utilized in such prior art altimeters do not enable a direct gearing of the synchro and the servo motor due to the torque capability limitations associated with prior art servo motors. Furthermore, such prior art servo motors require differential mounting and slip rings due to the necessity of rotation of the synchro housing for barometric corrections. In addition, conventional servo motors utilized in such prior art altimeters do not necessarily provide a smooth, stable servo response and introduce stop-and-jump friction characteristics in the altimeter, a considerable amount of friction being added to the pneumatic mechanism by each additional gear pass required in such a prior art dual mode altimeter. This often results in pointer whipping in prior art pneumatic altimeters as a result of system inertia, this whipping becoming pronounced at higher altitudes.

In an attempt to overcome the disadvantages associated with high mass A.C. induction servo motors, low mass drag cup motors have been utilized. However, although more satisfactory than the high mass A.C. induction motors, these drag cup motors are still inefficient and not satisfactory. When a drag cup motor is utilized as the drive component in the servoed mode of the altimeter, severe effects of temperature on the operation of the servo-pneumatic altimeter are present. The drag cup motor experiences severe gain changes of the motor torque constant due to resistance changes of the drag cup and these changes must be compensated for by a servo amplifier whose gains vary inversely with temperature. Such temperature variations produce unsatisfactory results and variations in the motor torque constant occur over the operational temperature range of such prior art altimeters. Such prior art altimeters, therefore, have unpredictable and unreliable servo loop stability due to gain variations with respect to temperature and other environmental effects such as humidity, vibration and dirt contamination.

Since the altimeter is one of the most critical instruments on board an aircraft in that it indicates to the pilot dynamic altitude changes, predictability and reliability of operation are critical factors, and any deviation in these factors cannot be tolerated.

These disadvantages of the prior art are overcome by the present invention.

SUMMARY OF THE INVENTION

An improved dual mode altimeter which includes an altitude display means, pressure responsive drive means including diaphragm capsule means adapted to expand and contract in response to increases and decreases in altitude, mechanical means connecting the pressure responsive drive means to the display means for driving the display means in response to the expansion and contraction of the capsule means, a remote altitude signal source, and a servo means including a follow-up synchro connected in driving relationship to the altitude display means, the servo means being responsive to a signal received from the remote source for effecting overriding of the pressure responsive drive means for driving the mechanical means and, thus, the display means in response to the received signal, has a brushless D.C. motor operatively connected to the synchro means in a closed servo loop, the motor also being connected to the mechanical means. The brushless D.C. motor preferably has a first stator, a magnetic rotor rotatably positioned in magnetic coupled relation with the first stator, a magnetic flux sensor means positioned in fixed relation to the rotor for sensing the magnitude of the rotor flux density as a sinusoidal function of angular position of the rotor and producing a driving signal proportional thereto for driving the fllow-up synchro substantially to a null, a second stator having a winding electrically independent from the first stator and positioned in magnetic coupled relation with the rotor and an independent feedback path including the second stator winding, whereby direct rate feedback control for the sensor means is provided. The synchro, which is preferably a multi-cycle synchro, has a stator and a magnetic rotor rotatably positioned in magnetic coupled relation with the stator. The stator is operatively connected to receive the signal from the remote altitude signal source and includes hairspring pickoff means operatively connected to the rotor for providing the magnitude of the rotor flux density as a sinusoidal funtcion of angular position of the synchro rotor.

The altimeter, which preferably includes a pair of diaphragm capsules in the pressure responsive drive means, also includes an associated rocking shaft connected to each of the capsules, a parallel bar linkage operatively connected to the rocking shaft of the respective capsules, a gear sector operatively associated in the parallel bar linkage, a gear train connecting the mechanical means in driving relationship with the gear sector whereby the display means is driven in response to the expansion and contraction of the capsules, according to changes in altitude, the gear train having a first pass off the gear sector, the synchro being connected in meshing relationship with the gear train, and the brushless D.C. motor has a driving pinion wherein the driving pinion comprises the first pass off the gear sector and is connected in meshing relationship with the gear sector. The follow-up synchro is preferably geared to the brushless D.C. motor driving pinion by a single pass which includes a hairspring load. The altimeter includes means for changing from the servoed mode to the pneumatic mode. This mode changing means includes means, such as a relay, for electrically opening the servo loop and grounding the brushless D.C. motor excitation stator when the altimeter is in the pneumatic mode whereby the motor provides magnetic damping in the pneumatic mode.

The synchro provides a pair of complementary sinusoidal signals, such as sine and cosine, in response to the signal received from the remote altitude signal source, such as an air data computer. The altimeter includes a scaling means operatively connected to receive one of the sinusoidal signals for providing a scaled output thereof and means for summing the scaled sinusoidal signal and the other sinusoidal signal of the pair in the servo loop for providing zero correction of the servo loop, the other signal also providing an error correction signal for the servo loop.

DETAILED DESCRIPTION OF THE PREFERRED EMBODIMENT

Figure 1:
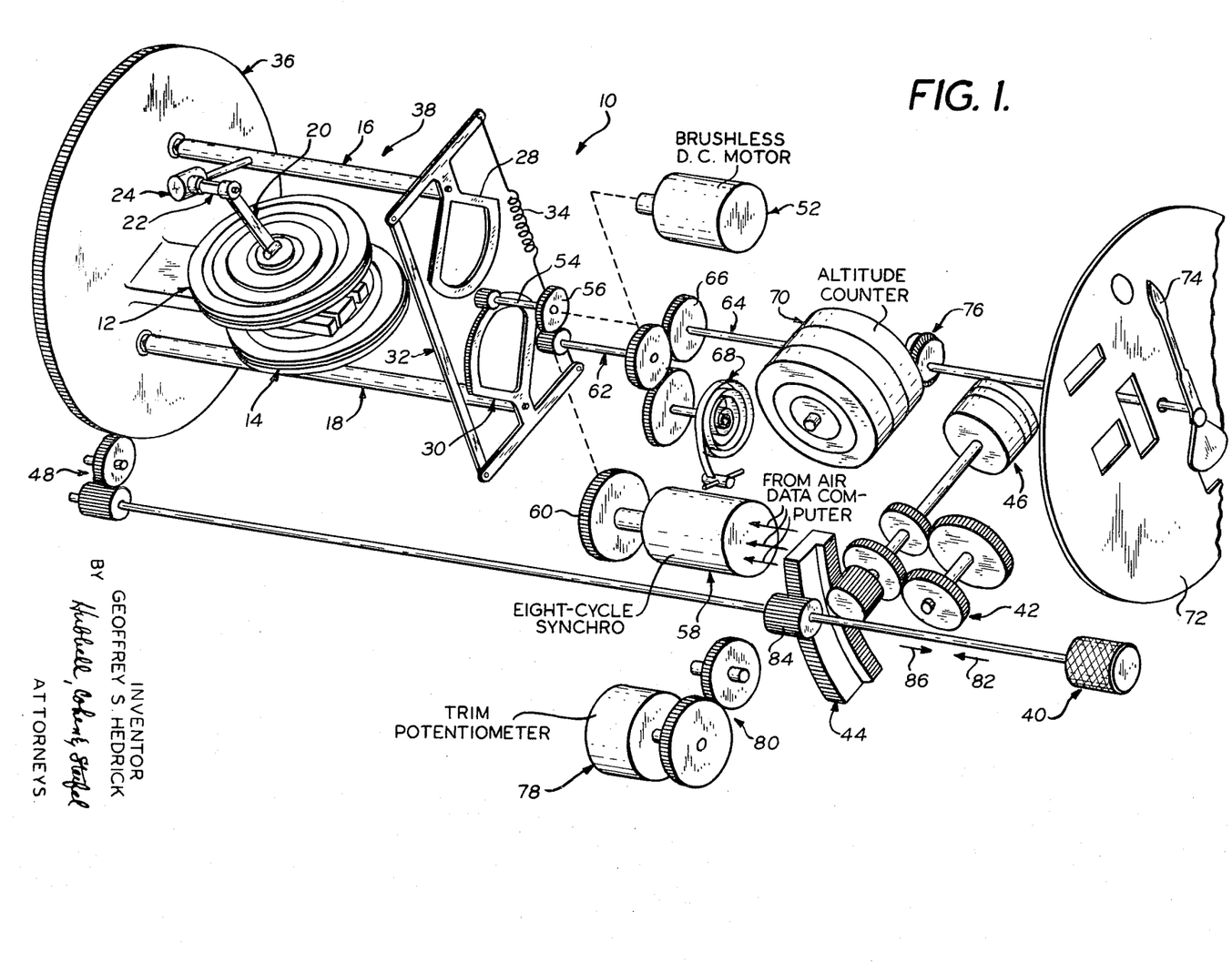
FIG. 1 is a partial exploded perspective view of the preferred embodiment of the altimeter of the present invention.

Referring now to the drawings in detail and especially to FIG. 1 thereof which is a partial exploded perspective view of the preferred dual mode altimeter of the present invention, generally referred to by the reference numeral 10. As will be explained in greater detail hereinafter, the preferred dual mode altimeter 10 has a pneumatic mode and a servoed mode as in a conventional dual mode or servo-pneumatic altimeter. The dual mode altimeter 10 preferably includes a pair of conventional twin aneroid diaphragm capsules 12 and 14, such as evacuated beryllium-copper diaphragm capsules, which expand and contract in conventional fashion in response to increases and decreases, respectively, in altitude. Preferably, each diaphragm capsule 12 and 14 is connected to a conventional rocking shaft 16 and 18, respectively. Preferably, diaphragm capsule 12 is connected to rocking shaft 16 in a conventional fashion by means of a link 20 connected to a conventional temperature compensator 22 which is mounted on a conventional calibration arm 24, calibration arm 24, in turn, being connected to rocking shaft 16. Aneroid diaphragm capsule 14 is preferably similarly connected to rocking shaft 18 in an identical fashion (not shown).

As shown and preferred, rocking shafts 16 and 18 are linked together by a conventional anti-backlash parallel bar linkage configuration 26 which permits parallel use of the capsules 12 and 14 and provides a maximum torque output with a minimum of friction in a conventional fashion. Parallel bar linkage 26, which as was previously mentioned, is conventional, preferably contains a pair of spaced apart sectors 28 and 30 which are preferably substantially symmetrical except that sector 28 is a blank sector and sector 30 is a toothed gear sector. Blank sector 28 is preferably mounted on rocking shaft 16 and gear sector 30 is preferably mounted on rocking shaft 18. Sectors 28 and 30 are preferably interconnected in the conventional parallel bar linkage configuration 26 by a link 32 on one end and a resilient member or spring 34 on the other end. Blank sector 28 provides mechanical balance for gear sector 30 in the conventional parallel bar linkage configuration 26 in order to provide a conventional symmetrical, balanced mechanism. Aneroid diaphragms 12 and 14 and rocking shafts 16 and 18 are preferably connected to a conventional gear member 36 which preferably permits rotation of the entire conventional rear mechanism 38 of the altimeter 10 in order to provide for barometric corrections, rear mechanism 38 comprising the diaphragm-rocking shaft-parallel bar linkage arrangement 12 through 36, inclusive, described above.

As will be explained in greater detail hereinafter, normal barometric adjustments for the altimeter 10 are preferably made by means of a conventional baro adjust knob 40 which is geared to a conventional gear train 42 and non-linear spiral gear 44 to a conventional baro counter 46 and to gear member 36 upon which rear mechanism 38 is mounted through gear members 48, rotation of baro adjust knob 40 simultaneously rotating the rear mechanism 38 and the baro counter 46.

A central pinion 50 is preferably arranged in meshing relationship with gear sector 30 in order to be driven thereby in response to movement of rocking shaft 18 and expansion or contraction of the aneroid diaphragms. The speed of rotation or drive of central pinion 50 is preferably determined by the movement of the diaphragms 12 and 14 and the geometry of the link 20 and calibration arm 24, multiplied by the gear ratio from the gear sector 30 to the central pinion 50. Preferably, a brushless D.C. motor 52, which will be described in greater detail hereinafter, is connected directly to the shaft 54 associated with the central pinion 50 so that central pinion 50 is, in effect, the driving pinion of motor 52. A gear 56 is also preferably mounted on shaft 54 for rotation therewith for a purpose to be described in greater detail hereinafter. Preferably, brushless D.C. motor 52 is preferably of the type disclosed in my U.S. Pat. No. 3,679,954 and entitled Brushless D.C. Motor.

As shown and preferred, a multi-cycle brushless synchro 58 which is preferably eight-cycle, is preferably connected directly to a gear 60 which is, in turn, preferably geared to central pinion 50 through a single pass comprising gears 56 and 60. Preferably, the synchro 58 is geared to the central pinion 50 with a ratio of 36:80 so as to make one revolution for each eighty thousand feet of altitude although, if desired, any other desired gear ratio could be utilized. The output of the rear mechanism 38 is preferably transmitted to a conventional gear and pinion assembly 62 which is geared to shaft 54 via gear 56 mounted thereon. Gear and pinion assembly 62 is, in turn, preferably connected in driving relationship to a conventional pointer shaft 64 via gear 66 connected in meshing relationship with gear and pinion assembly 62. Preferably, gear and pinion assembly 62 and gear 66 mounted on pointer shaft 64 are geared to a conventional hairspring mechanism 68, eliminating backlash, hairspring 68 preferably being geared so that its rotation is limited to two turns.

As shown and preferred, the altimeter 10 preferably includes a conventional altitude display mechanism including a conventional altitude counter 70 comprising a plurality of rotating drums, a dial 72 having marked thereon a suitable scale of altitude designations, the dial 72 preferably being provided with cutouts or windows through which the settings of the baro counter 46 and altitude counter 70 may be viewed, and a conventional pointer 74 mounted on pointer shaft 64 for rotation therewith, the pointer 74 cooperating with the face dial 72 for displaying altitude information. If desired, any other conventional altitude display means may be utilized without departing from the scope of the present invention. Preferably, by way of example, if one of the drums associated with altitude counter 70 is marked in hundred foot increments, the pointer 74 and the hundred foot drum make one revolution for one thousand feet of altitude and the counter 70 displays the altitude in thousands of feet directly, in such instance, the counter 70 also having a thousand foot and ten thousand foot drum.

Figures 2, 3:
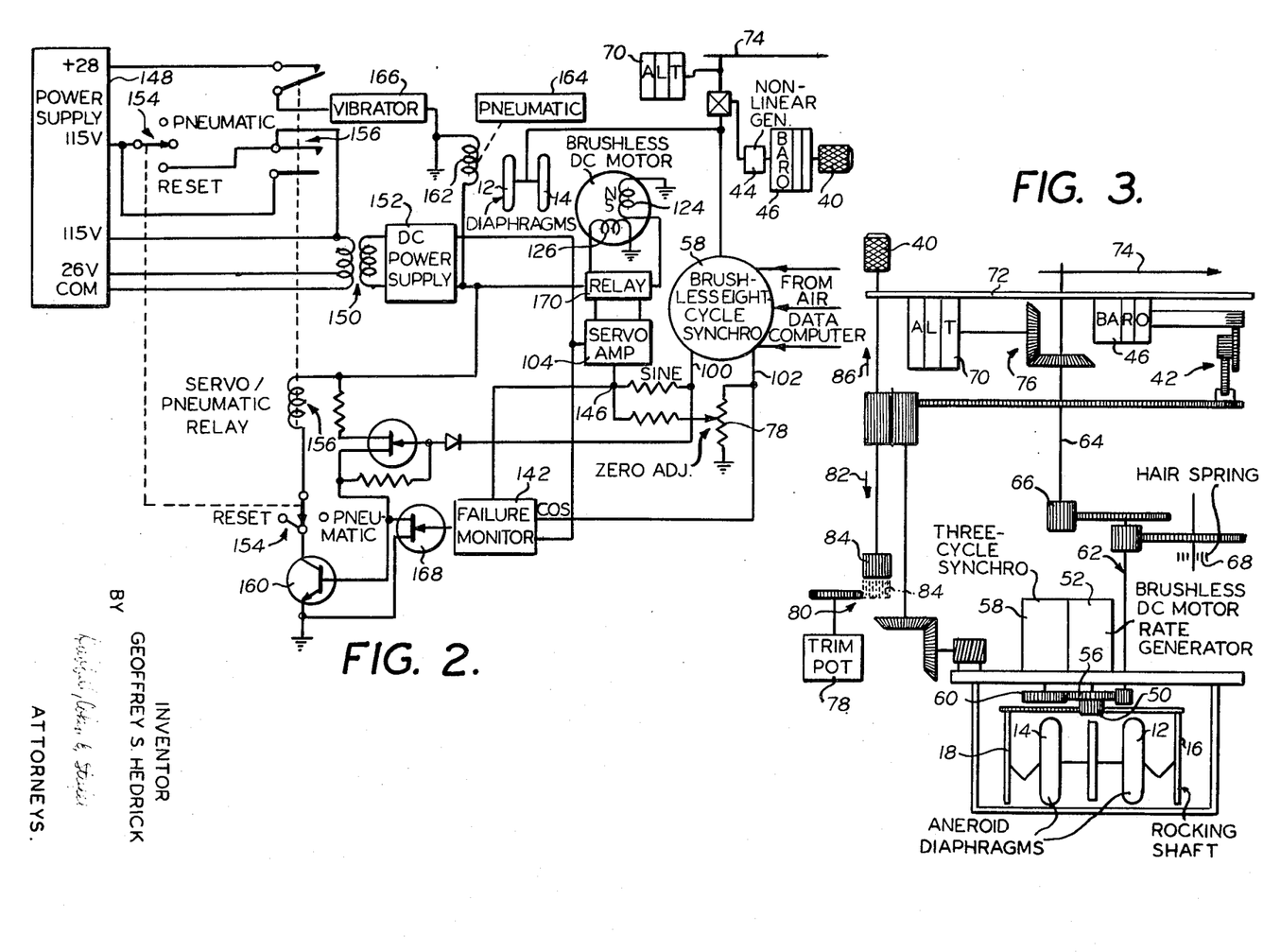
FIG. 2 is a simplified functional schematic of the altimeter shown in FIG. 1.
FIG. 3 is a simplified diagrammatic view of the embodiment shown in FIG. 1 showing the preferred mechanical gearing arrangement.

An shown and preferred in FIGS. 1 and 3, the altitude counter 70 is preferably driven from the pointer shaft 64 by means of conventional one-to-one bevel gearing 76, one bevel gear being mounted on pointer shaft 64 for rotation therewith and the cooperating bevel gear being mounted on the drive shaft for altitude counter 70.

Preferably, a conventional trim potentiometer 78 is provided for rezeroing of the eight-cycle synchro mechanism 58. As will be explained hereinafter, trim potentiometer 78 is directly connected to a gear arrangement 80 which, when the baro knob 40 is pushed in the direction indicated by arrow 82 engages gear assembly 80 through gear 84 mounted on the shaft associated with baro knob 40 for accomplishing the zeroing of the synchro 58 by rotation of the shaft of the trim potentiometer 78, when the baro knob is in this push position, the engagement being shown by dotted lines in FIG. 3. Similarly, if the baro knob 40 is pulled in the direction indicated by arrow 86, the baro counter 46 may be rezeroed, the rear mechanism 38 being disengaged from the knob drive in this pull position. Preferably, the baro adjust mechanism including knob 40 and gear 84 is normally locked in the neutral position illustrated in solid lines in FIGS. 1 and 3.

Figure 4:
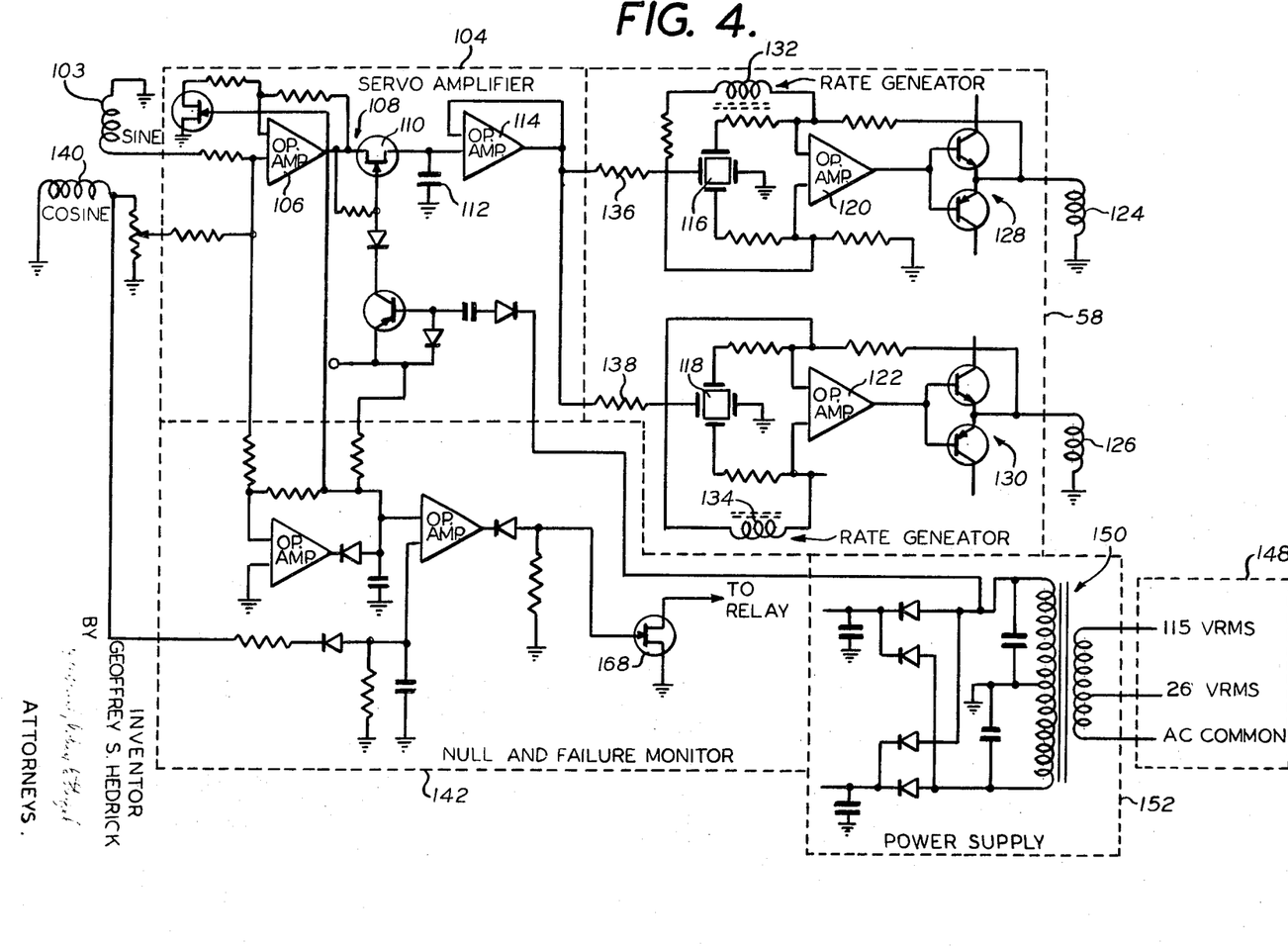
FIG. 4 is a partial detailed schematic of the embodiment shown in FIG. 2.

Referring now to FIGS. 2 and 4 and describing the associated electronics assembly for the servoed mode of the altimeter 10, the mechanical pressure responsive assembly having been described above. The brushless eight-cycle synchro 58 preferably receives a three wire synchro altitude signal from a remote altitude signal source such as an air data computer (not shown). The synchro 58 is preferably a conventional synchro having a stator and a rotor, the three wire synchro altitude signal input being fed to the stator thereof. Preferably, the synchro 58 includes hairspring pickoffs (not shown), such as beryllium-copper hairsprings, to remove the complementary sinusoidal signals, which are preferably sine and cosine signals, from the synchro rotor. These hairspring pickoffs also preferably remove backlash between the brushless D.C. servo motor 52 and the follow-up pass 56–60 and take play out of the rear mechanism 38 linkage without presenting high loads through the pneumatic gear train. Preferably, this synchro 58, which is a transolver, provides a pair of complementary sinusoidal output signals, one signal being proportional to the sine, and one signal being proportional to the cosine of the shaft angle differences, these signals being provided via paths 100 and 102, respectively. The output of the sine winding 103 (FIG. 4) of synchro 58 is preferably utilized as an error signal source in the closed servo loop which includes synchro 58, brushless D.C. motor 52 and a conventional servo amplifier 104.

The servo amplifier 104, which is shown in greater detail in FIG. 4, is preferably a conventional servo pre-amplifier built around a high gain integrated circuit operational amplifier 106. This pre-amplifier 104 not only amplifies the signal but preferably provides a virtual ground summing mode for the sine and cosine signal and an extremely low output impedance for the peak sampling demodulator network 108 which preferably includes a zero offset junction field effect transistor 110 as the analog commutator therefor. The output of pre-amplifier 106 is preferably operatively connected to the peak sampling demodulator 108 which provides quadrature rejection without inducing excessive lag. The output of the peak sampling demodulator is connected to a holding capacitor 112 (FIG. 4) for charging the capacitor 112 at the peak of the signal sine wave. Capacitor 112 is buffered by another high gain operational amplifier 114 which provides a driving signal for the brushless D.C. motor 52, as will be explained in greater detail hereinafter.

The brushless D.C. motor rate generator 52 preferably includes a pair of Hall effect sensors 116 and 118 which are operatively connected in parallel to the output of operational amplifier 114. The outputs of the Hall sensors 116 and 118 are operatively connected to differential amplifiers 120 and 122, respectively. These differential amplifiers 120 and 122 are operatively connected to the motor drive windings 124 and 126, respectively, through respective complementary symmetry output stages 128 and 130. Preferably, as will be explained in greater detail hereinafter, the sensors 116 and 118 are connected to independent generator windings 132 and 134, respectively, whose outputs are scaled by series resistors 136 and 138, respectively, and are summed with the respective Hall sensors 116 and 118. This provides null-free direct rate sensing since the voltage on these windings is proportional to the angular velocity of the rotor of the brushless D.C. motor by the equation $Eg \propto nw [\sin(wt.)]$. Preferably, if desired, non-linear damping action may be provided for the brushless D.C. motor rate generator 52 by placing a capacitor across each of the two generator windings 132 and 134 in order to take advantage of the variable frequency component of this rate signal. As the phase shift from the generator passes through 90°, the rate generator damping coefficient reduces to zero; and as the angular velocity increases, the generator provides a positive feedback signal.

Referring once again to FIG. 2, the cosine winding output provided via path 102 from cosine winding 140 (FIG. 4) of synchro 58, is fed to a conventional failure monitor configuration 142, shown in greater detail in FIG. 4, as is the sine winding output via path 100, the failure monitor 142 comparing the sine and cosine signals to derive the angular difference between the electrical signal altitude and the pneumatic sensed altitude. By comparing the sine against the cosine signals the amplitude coefficient falls out such that this angular difference can be precisely measured and controlled independent of temperature, transformation ratio in the transmitter and pick-off and phase shift. The sine output via path 100 is therefore connected in parallel to servo amplifier 104 and failure monitor 142. Similarly, the cosine signal output of synchro 58 provided via path 102 is connected in parallel to servo amplifier 104 through scaling impedance 78 at summing junction 146, the scaled and summed cosine signal being utilized to provide zero correction for the servo loop which is totally independent of signal level, temperature and phase shift.

Preferably, basic excitation for the altimeter 10 is derived from an A.C. power supply 148, such as a 115 volt, 400 Hz. power supply. As shown by way of example in FIG. 4, this voltage excites a conventional power transformer 150 which provides an isolated source for a D.C.

power supply 152 and a 26 volt 400 Hz. output for excitation of the synchro transmitter in the remote air data computer (not shown). The voltage input from power supply 148, which in the example given is 115 volts, is preferably under control of a reset-pneumatic mode selection switch 154 and a servo/pneumatic relay 156. When initially excited, the 115 volt output of power supply 148 is prevented from reaching the power transformer 150, preferably, by open contacts on the servo/pneumatic relay 156. These contacts are bypassed by placing the reset-pneumatic switch 154 in the reset position. In such an instance, assuming the servo is properly synchronized, the servo/pneumatic relay 156 will close providing the 115 volt input from power supply 148 continuously to the power transformer 150. Movement of the reset-pneumatic switch 154 to the pneumatic position opens a contact in series with the servo/pneumatic relay 156, thereby de-energizing the system. A transistor 160 in series with the servo/pneumatic relay 156 de-energizes the system when a failure is detected by the servo failure monitor 142. Preferably, in such an instance, a flag solenoid 162 which controls the movement of a pop-up flag with the word PNEUMATIC preferably marked thereon, and which is preferably connected to the output of the D.C. power supply 152, loses power when the system is de-energized providing a fail-safe mode indication due to the pop-up of the PNEUMATIC flag 164. A conventional vibrator configuration 166, which is preferably operatively connected between an external 28 volt power supply input and the flag solenoid 162 through a normally closed point of the servo/pneumatic relay 156, is energized when the system is in the pneumatic mode by applying the external 28 volt input to the normally closed points of the servo/pneumatic relay 156.

As was previously mentioned, the servo failure monitor 142 receives inputs of the servo null, the cosine winding, and amplifier power to provide basic monitoring for loss of null, signal power, amplifier power and monitor power. If a failure occurs, a conventional field effect transistor 168 in the output circuit of the failure monitor 142 removes the bias from the transistor 160 connected in series to the servo/pneumatic relay 156, thereby switching the altimeter to the pneumatic mode, the system being de-energized and the PNEUMATIC flag 164 popping-up. Preferably, as will be described in greater detail hereinafter, in the servo mode the rate signal associated with the brushless D.C. motor 52 is utilized for stability. A relay 170 is operatively connected to excitation windings 124 and 126 of the brushless D.C. motor 52 between the output of servo amplifier 104 and the input to the excitation windings 124 and 126. In the servo mode, relay 170 is normally closed to permit the servo amplifier 104 output to be fed directly to excitation windings 124 and 126 exciting the brushless D.C. motor 52. In the pneumatic mode, however, relay 170 disconnects the servo amplifier output 104 from the excitation windings 124 and 126 and switches these windings 124 and 126 to ground in order to provide magnetic damping in the pneumatic mode. The relay 170 is also operatively connected to the output of D.C. power supply 152 which is also conected to servo amplifier 104.

As shown in FIGS. 1, 2 and 3, the altitude counter 70 and pointer 74 are driven by the brushless D.C. motor rate generator 52 and the brushless eight-cycle synchro 58 in the servoed mode and by the set of altitude diaphragms 12 and 14 in the pneumatic mode, both these units being geared directly together so that no mechanical engagement or disengagement is necessary for mode switching. Preferably, the brushless D.C. motor rate generator 52 and the synchro 58 are mounted to the diaphragms 12 and 14 on the rear mechanism 38, for rotation therewith, so that they may be placed in the gear train at a position of maximum torque for minimum loading in the pneumatic mode, barometric corrections being made by differentially rotating the rear mechanism 38 with the knob 40 and barometric counter 46 through the non-linear gear train 44.

BRUSHLESS D.C. MOTOR RATE GENERATOR

Figure 5:
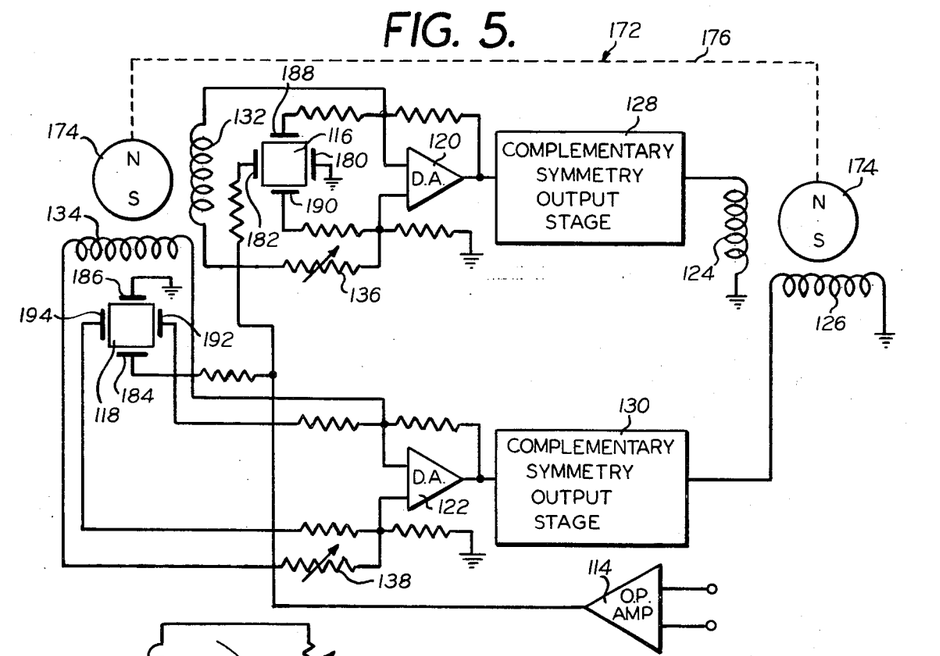
FIGS. 5 and 6 are schematic diagrams partially in block of the preferred embodiment of the brushless D.C. motor portion of the embodiment shown in FIGS. 1 through 4.
Figure 6:
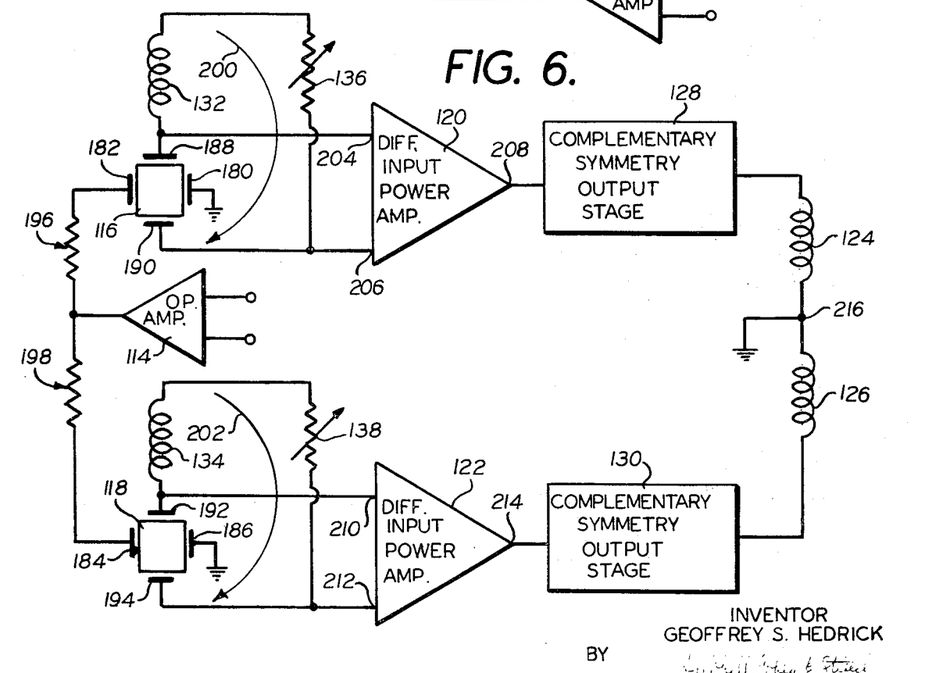

As was previously mentioned, the brushless D.C. motor rate generator 52 is preferably of the type disclosed U.S. Pat. No. 3,679,954 and entitled Brushless D.C. Motor. Therefore, this motor rate generator 52 will not be described in greater detail hereinafter, except for portions of this disclosure which will be reproduced hereinafter only for purposes of clarity. Referring now to FIGS. 5 and 6 and describing in greater detail the preferred brushless D.C. motor rate generator 52 portion of the servo loop of the altimeter 10 of the present invention. The brushless D.C. motor 52, which may be a conventional brushless D.C. motor such as the type readily available from Siemans Corporation of America, is preferably a multispeed motor and preferably includes an excitation stator preferably consisting of the two perpendicular excitation windings 124 and 126, respectively, which are commonly termed the sine and cosine windings, respectively. These excitation windings 124 and 126, preferably, each have an equal number of turns of wire and are of substantially equal resistance for a purpose to be described in greater detail hereinafter. The motor 52 also, preferably, includes a magnetic rotor, generally referred to by the reference numeral 172, rotatably positioned in magnetic relation with the stator excitation windings 124 and 126. As shown and preferred, the rotor 172 includes a permanent magnet 174 which is suported by a shaft 176 for rotation.

As also shown and preferred, the two magneto-sensitive conventional Hall effect sensors 116 and 118 are angularly displaced apart from each other, preferably at an angle of 90° If desired, Hall sensors 116 and 118 could be replaced by any other magnetic flux sensor which provides a signal proportional to magnetic flux, such as magnetically sensitive transistors which are commercially available under the name Magnistor. Furthermore, as shown and preferred, the sensors 116 and 118 are also angularly displaced 90° with respect to the magnetic axes of the excitation windings 124 and 126, respectively. Hall sensor 116 is angularly displaced 90° with respect to the magnetic axis of winding 124 and Hall sensor 118 is angularly displaced 90° with respect to the magnetic axis of winding 126 If desired, the angular displacement of the Hall sensors 116 and 118 with respect to the respective magnetic axes of the excitation windings 124 and 126 could be any desired angle other than 90° such as 45°.

Referring now to FIG. 6, the additional stator windings 132 and 134 which are, preferably, magnetically independent of stator excitation windings 124 and 126 are provided in order to provide direct rate sensing, as will be described in greater detail hereinafter. Stator windings 132 and 134 are preferably wound on a second stator stack to prevent direct coupling to the excitation windings 124 and 126. These independent stator windings 132 and 134 are, preferably, perpendicular to each other. Stator winding 132 is, preferably, aligned with the magnetic axis of Hall sensor 116 and independent stator winding 134, is preferably, aligned with the magnetic axis of Hall sensor 118. Each Hall sensor 116 and 118 includes a pair of input terminals 180-182, and 184-186, respectively, which are displaced 180° apart from each other, and a pair of output terminals 188-190, and 192-194, respectively, which are also each displaced 180° apart from each other. Each of the terminals 180 through 194, inclusive, is associated with an electrode of the respective Hall sensors 116 and 118 to either apply an electrical potential thereto or to pick up an electrical potential therefrom.

Terminals 182 and 184 of Hall sensors 116 and 118, respectively, are connected through resistors 196 and 198, respectively, which are connected in common, to the output of the high gain operational amplifier 114 to provide a current source for sensors 116 and 118. Preferably, the value of resistors 196 and 198 are equal and substantially greater than the internal impedance of the respective Hall sensors 116 and 118 so as to provide a constant current source therefor. Independent stator winding 132 is connected in an independent feedback path 200 between output terminal 188 and output terminal 190 of the Hall sensor 116 to provide a direct rate feedback signal thereto in a manner to be described in greater detail hereinafter. The feedback path 200 preferably includes the scaling resistor 136 connected between the independent stator winding 132 and the output terminal 190 of the Hall sensor 116. The value of the scaling resistor 136 is chosen to be equivalent to the proportionality constant between the angular velocity of the rotor shaft 176 and the induced signal applied to the Hall sensor 116 through winding 132, so as to, preferably, provide a linear torque-speed relationship.

The scaling resistor 136 provides a linear slope for the torque-speed curve of the motor which may be changed by merely changing the value of the resistor 136. If a non-linear torque-speed relationship is desired, the scaling resistor 136 may be replaced by a non-linear impedance such as a capacitor (not shown). Furthermore, resistor 136 in addition to the previously described scaling function also performs the function of providing a feedback signal which is substantially independent of variations in the internal impedance of the Hall sensor 116. If these functions are not desired, this scaling resistor 136 may be omitted.

A similar arrangement is, preferably, provided for Hall sensor 118 wherein an independent feedback path 202 between output terminal 192 and input terminal 194 is provided. This feedback path 202 includes the winding 134 and the other scaling resistor 138, whose functions are similar to those of scaling resistor 136 described above and which also may be omitted if these functions are not desired. Furthermore, if a non-linear torque-speed relationship is desired, resistor 138 could be replaced by a non-linear impedance, such as a capacitor (not shown).

Output terminal 188 and output terminal 190 of Hall sensor 116 are, preferably, connected to the differential input power amplifier 120, which is conventional and will not be described in greater detail hereinafter. Suffice it to say that differential input power amplifier 120 includes two input terminals 204 and 206, output terminal 188 being connected to input terminal 204 through an impedance, omitted in FIG. 6 for purposes of clarity, and output terminal 190 being connected to input terminal 206 through another impedance, also omitted in FIG. 6 for purposes of clarity, and an output terminal 208, which output terminal 208 is connected to stator excitation winding 124 through complementary symmetry output stage 128 to provide a signal path thereto in a manner to be described in greater detail hereinafter.

Similarly, for Hall sensor 118, the other conventional differential input power amplifier 122 has input terminals 210 and 212 connected to output terminals 192 and 194, respectively, of Hall sensor 118 through respective impedances, omitted in FIG. 6 for purposes of clarity, and an output terminal 214 which is connected to excitation winding 126 through complementary symmetry output stage 130 to provide a signal path thereto in a manner to be described in greater detail hereinafter. Excitation windings 124 and 126, preferably, have their opposite ends connected together at a point 216 which is, in turn, connected to ground.

If desired, other servo mechanisms, or other arrangements of brushless D.C. motor rate generators, such as the alternative embodiments described in my copending U.S. application Ser. No. 54,387, previously incorporated by reference herein, may be utilized without departing from the present invention.

OPERATION

Now describing in greater detail the operation of the dual mode altimeter 10 of the present invention. Generally describing the operation of the altimeter 10, the altimeter 10, as was previously mentioned, has servoed and non-servoed or pneumatic modes of operation. In the servoed mode, the altimeter 10 is electronically operated from a synchro signal received from a remote altitude signal source such as an altitude computer or an air data computer with equivalent synchro signals. The servo loop comprising synchro 58, servo amplifier 104 and brushless D.C. motor 52 is continuously monitored by failure monitor 142 and, in the vent of failure, will cause the altimeter 10 to automatically revert to the mechanical pneumatic operation, the altimeter 10 the operating purely as a pneumatic device with the friction reducing vibrator 166 automatically energized. As was previously mentioned, when the altimeter 10 is operating in the pneumatic mode a flag 164 with the word PNEUMATIC thereon preferably appears above the altitude counter 70 in the altitude display.

Pilot control of the altimeter 10 mode may be maintained by means of the reset-pneumatic selection switch 154. When the altimeter 10 is initially energized it is in the pneumatic mode. By holding the reset-pneumatic switch 154 in the reset position until the PNEUMATIC flag 164 disappears from the altitude display, the altimeter 10 will be synchronized with the remote air data computer. Switch 154 will then return to the neutral position shown in FIG. 2. If desired, the altimeter 10 may be manually returned to the pneumatic mode by movement of the reset-pneumatic switch 154 to the pneumatic position. In addition, if desired, switch 154 may be overridden by remote switching.

As was previously mentioned, the basic excitation for the altimeter 10 is derived from the power supply 148 which is preferably a 115 volt 400 Hz. power supply. This voltage excites a power transformer 150 which provides an isolated source for the D.C. power supply 152 and the 26 volt 400 Hz. output for excitation of the synchro transmitter in the remote air data computer. This 115 volt input is under control of the reset-pneumatic switch 154 and the servo/pneumatic relay 156. When initially excited, the 115 volt input is prevented from reaching the power transformer 150 by open contacts on the servo/pneumatic relay 156. These contacts are bypassed by placing the reset-pneumatic switch 154 in the reset position. Assuming the servo 58 is synchronized, the servo/pneumatic relay 156 closes, providing the 115 volt supply continuously to the power transformer 150.

Movement of the reset-pneumatic switch 154 to the pneumatic position opens a contact in series with the servo/pneumatic relay 156 which contact is operatively connected to the collector of transistor 160 (FIG. 2), thereby de-energizing the system and placing it in the pneumatic mode. Transistor 160 which is in series with the servo/pneumatic relay 156 de-energizing the system when a failure is detected by the failure monitor 142. As was previously mentioned, the vibrator 166 is energized when the system is in the pneumatic mode by the application of an external power source, such as 28 volts, through the normally closed points of the servo/pneumatic relay 156. If a failure occurs such as loss of null, signal power, amplifier power or monitor power, the field effect transistor 168 in the output circuit of the failure monitor 142 removes the bias from transistor 160 thereby switching the altimeter 10 to the pneumatic mode.

Preferably, a three wire synchro altitude signal is provided from the remote air data computer and is fed to the stator of the eight cycle synchro 58, which is preferably a brushless transolver. The hairspring pickoff associated with the synchro 58 removes the sine and cosine signals from the synchro rotor and also removes backlash between the motor 52 and follow-up pass and takes play out of the rear mechanism linkage 38 without presenting high loads through the pneumatic gear train. The output of synchro 58 provides two signals, one proportional to the sine and one proportional to the cosine of the shaft angle differences. As was previously mentioned, the sine winding is utilized as an error signal generator in the servo loop and the cosine winding is utilized to monitor the presence of the input signal and is scaled and summed with the sine winding to provide zero correction for the servo loop. The failure monitor 142 compares the sine and cosine signals provided from synchro 58 to derive an angular difference between the electrical signal altitude and the pneumatic sensed altitude.

As was previously mentioned, the sine winding signal is summed with the scaled cosine winding signal from synchro 58 and utilized for zero adjustment in the servo preamplifier 106 not only amplifies the signal but pro- pre-amplifier 106 not only amplifies the signal but provides a virtual ground summing mode for the sine and cosine signal and low output impedance for the peak sampling demodulator 108. The field effect transistor analog switch 110 associated with peak sampling demodulator 108 opens for a predetermined time interval at the peak of the signal wave charging capacitor 112. The D.C. signal on this capacitor 112 is buffered by the motor drive amplifier 114. This amplifier 114 presents high load impedance to the capacitor 112 and a low source impedance to the Hall effect generator current scaling resistors 136 and 138. This phase sensitive D.C. signal produces an excitation current in the brushless D.C. motor Hall effect sensors 116 and 118.

The output of these Hall effect sensors 116 and 118, which is proportional to the excitation current times the magnetic flux density, is amplified by high gain operational amplifiers 120 and 122, respectively, with complementary symmetry output stages 128 and 130, respectively. These operational amplifiers 120 and 122 with the complementary symmetry output buffers 128 and 130, respectively, are operated in the differential configuration producing a voltage on the perpendicularly wound excitation windings 124 and 126, respectively, which is proportional to the error signal. The second set of perpendicular windings 132 and 134 provide direct rate sensing. These windings 132 and 134 are fed into their associated differential power amplifiers 120 and 122, respectively, providing loop damping. Preferably, the dynamic viscous damping provided by the brushless D.C. motor 52 is enhanced by the self-damping of the permanent magnet 174 as it moves in the excitation windings 124 and 126 connected to the zero source impedance servo amplifier 104. In the pneumatic mode, relay 170, preferably, completely disconnects the excitation winding 124 and 126 from the servo amplifier 104 and shorts them to ground. These shorted excitation windings 124 and 126, preferably, provide a similar but lower magnitude viscous damping to the pneumatic mechanism.

In the pneumatic mode, the operation of the altimeter 10 is conventional except for the magnetic damping provided by the brushless D.C. motor rate generator 52 which enhances performance, and will not be described in greater detail hereinafter. Suffice it to say that the mechanical linkages 20-22-24 couple the diaphragm capsules 12 and 14, which expand and contact in response to increases and decreases in altitude, to the rocking shafts 16 and 18 to convert linear diaphragm deflection into angular motion. The diaphragm capsules 12 and 14 are arranged to act in parallel in conventional fashion, thereby multiplying the torque output. The parallel bar linkage 26 connecting the twin rocking shafts 16 and 18, which are driven by capsules 12 and 14, respectively, permits the multiplied torque to be coupled to the central pinion 50 associated with the pneumatic drive mechanism with minimum losses as only one gear sector 30 is in mesh. As central pinion 50 is caused to rotate, gear and pinion assembly 62 is driven which, in turn, drives gear 66 connected to shaft 64. This, in turn, rotates pointer 74 and drives altitude counter 70 by means of the bevel gear arrangement 76 in response to the expansion and contraction of capsules 12 and 14 in the pneumatic mode. In this manner, pneumatic drive for the altimeter 10 is provided. As was previously mentioned, barometic correction is preferably accomplished by differentially rotating the rear mechanism 38 from the baro adjust knob 40 and barometric counter 46 through the non-linear gear train 44.

It is to be understood that the above described embodiment of the invention is merely illustrative of the principles thereof and that numerous modifications and embodiments of the invention may be derived within the spirit and scope thereof, such as by utilizing a three-cycle synchro in place of the eight cycle synchro.

What is claimed is:

1. In an altimeter comprising an altitude display means, pressure responsive drive means including diaphragm capsule means adapted to expand and contract in response to increases and decreases in altitude, mechanical means connecting said pressure responsive drive means to said display means for driving said display means in response to expansion and contraction of said capsule means, a remote altitude signal source, servo means including a follow-up synchro connected in driving relationship to said altitude display means, said servo means being responsive to a signal received from said remote altitude signal source for effecting overriding of said pressure responsive drive means for driving said mechanical means for driving said display means in response to said signal from said remote altitude signal source; the improvement comprising a brushless D.C. motor operatively connected to said synchro means and said mechanical means, said motor and said synchro comprising said servo means, said servo means being a closed servo loop; said motor having a first stator, a magnetic rotor rotatably positioned in magnetic coupled relation with said first stator, a magnetic flux sensor means positioned in fixed relation to said rotor for sensing the magnitude of the rotor flux density as a sinusoidal function of angular position of the rotor and producing a driving signal proportional thereto for driving said follow-up synchro substantially to a null, a second stator having a winding electrically independent from said first stator and positioned in magnetic coupled relation with said rotor, and an independent feedback path including said second stator winding whereby direct rate feedback control for the sensor means is provided.

2. An apparatus in accordance with claim 1 wherein said sensor is capable of producing a voltage which is proportional to a sinusoidal function of the combined angular position of the rotor and the angular position of the sensor with respect to the first stator.

3. An apparatus in accordance with claim 1 wherein said magnetic flux sensor means is a Hall effect sensor means.

4. An apparatus in accordance with claim 1 wherein said first stator comprises first and second windings electrically angularly displaced from each other and said magnetic flux sensor means comprises first and second sensors angularly displaced with respect to each other and to said first stator first and second windings, respectively.

5. An apparatus in accordance with claim 4 wherein said second stator further comprises a second stator winding; each sensor has an associated independent feedback path for said sensor, said first sensor feedback path including said second stator first winding and said second sensor feedback path including said second stator second winding.

6. An altimeter in accordance with claim 1 wherein said synchro is a multi-cycle synchro.

7. An altimeter in accordance with claim 1 wherein said synchro has a stator and a magnetic rotor rotatably positioned in magnetic coupled relation with said stator, said stator being operatively connected to said signal from said remote altitude signal source, said synchro including hairspring pickoff means operatively connected to said rotor for providing the magnitude of the rotor flux density as a sinusoidal function of angular position of the synchro rotor.

8. An altimeter in accordance with claim 6 wherein said synchro is a brushless transolver.

9. An altimeter in accordance with claim 8 wherein said synchro is at least three-cycle.

10. An altimeter in accordance with claim 8 wherein said synchro is eight-cycle.

11. In an altimeter comprising an altitude display means, a shaft operatively connected to said display means, a pressure responsive drive means mechanically connected to said display means shaft to effect the driving of said display means accordingly, said pressure responsive drive means including a pair of diaphragm capsules, an associated rocking shaft connected to each of said capsules, a parallel bar linkage operatively connected to the rocking shafts of the respective capsules, a gear sector operatively associated in said parallel bar linkage, a gear train connecting said display means shaft in driving relationship with said gear sector whereby said display means is driven in response to the expansion and contraction of said capsules according to changes in altitude, said gear train having a first pass off the gear sector, servo means including a follow-up synchro connected in meshing relationship with said gear train, a remote altitude signal source operatively connected to said synchro, said servo means being responsive to a signal received from said remote altitude signal source for effecting overriding of said pressure responsive drive means to effect driving of said display means shaft in response to said signal from said remote altitude signal source; the improvement comprising a brushless D.C. motor operatively connected to said synchro means and said display means shaft, said motor and said synchro comprising said servo means, said servo means being a closed servo loop, said motor having a driving pinion, said driving pinion comprising said first pass off the gear sector, said driving pinion being connected in meshing relationship with said gear sector.

12. An altimeter in accordance with claim 11 wherein said follow-up synchro is geared to said brushless D.C. motor driving pinion by a single pass.

13. An altimeter in accordance with claim 12 wherein said single pass includes a hairspring board.

14. An altimeter in accordance with claim 11 wherein said brushless D.C. motor comprises a first stator, a magnetic rotor rotatably positioned in magnetic coupled relation with said first stator, a magnetic flux sensor means positioned in fixed relation to said rotor for sensing the magnitude of the rotor flux density as a sinusoidal function of angular position of the rotor and producing a driving signal proportional thereto for driving said follow-up synchro substantially to a null, a second stator having a winding electrically independent from said first stator and positioned in magnetic coupled relation with said rotor, and an independent feedback path including said second stator winding whereby direct rate feedback control for the sensor means is provided.

15. An altimeter in accordance with claim 14 wherein said altimeter has a first mode of operation and a second mode of operation, said servo means overriding said pressure responsive drive means only in said first mode, said display means being driven by said pressure responsive drive means in said second mode, said altimeter further including means for changing from said first mode to said second mode, said motor first stator comprising an excitation stator, said mode changing means including means for electrically opening said servo loop and grounding said brushless D.C. motor first stator when said altimeter is in said second mode whereby said motor provides magnetic damping in said second mode.

16. An altimeter in accordance with claim 11 wherein said synchro provides a pair of complementary sinusoidal signals in response to said signal received from said remote altitude signal source, said altimeter includes a scaling means operatively connected to receive one of said sinusoidal signals for providing a scaled output thereof, and means for summing said scaled sinusoidal signal and the other sinusoidal signal of said pair in said servo loop for providing zero correction of said servo loop, said other signal further providing an error correction signal for said servo loop.

17. An apparatus in accordance with claim 14 wherein said sensor is capable of producing a voltage which is proportional to a sinusoidal function of the combined angular position of the rotor and the angular position of the sensor with respect to the first stator.

18. An apparatus in accordance with claim 14 wherein said magnetic flux sensor means is a Hall effect sensor means.

19. An apparatus in accordance with claim 14 wherein said first stator comprises first and second windings electrically angularly displaced from each other and said magnetic flux sensor means comprises first and second sensors angularly displaced with respect to each other and to said first stator first and second windings, respectively.

20. An apparatus in accordance with claim 19 wherein said second stator further comprises a second stator winding; each sensor has an associated independent feedback path for said sensor, said first sensor feedback path including said second stator first winding and said second sensor feedback path including said second stator second winding.

References Cited
UNITED STATES PATENTS 3,495,462    2/1970    Knapp _____________ 73—386

DONALD O. WOODIEL, Primary Examiner